(12) United States Patent
Miyamoto

(10) Patent No.: US 8,229,162 B2
(45) Date of Patent: Jul. 24, 2012

(54) GRAPHIC RECOGNITION DEVICE, GRAPHIC RECOGNITION METHOD, AND GRAPHIC RECOGNITION PROGRAM

(75) Inventor: Shinichi Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 1044 days.

(21) Appl. No.: 12/160,816

(22) PCT Filed: Dec. 26, 2006

(86) PCT No.: PCT/JP2006/325903
§ 371 (c)(1),
(2), (4) Date: Jul. 14, 2008

(87) PCT Pub. No.: WO2007/083494

PCT Pub. Date: Jul. 26, 2007

(65) Prior Publication Data
US 2010/0254595 A1    Oct. 7, 2010

(30) Foreign Application Priority Data

Jan. 17, 2006  (JP) .................................. 2006-009132

(51) Int. Cl.
*G06K 9/00* (2006.01)
(52) U.S. Cl. ........................................ 382/103; 382/181
(58) Field of Classification Search .................. 382/103, 382/104, 159, 181, 199, 254
See application file for complete search history.

(56) References Cited

U.S. PATENT DOCUMENTS
2007/0115357 A1* 5/2007 Stein et al. .................... 348/148

FOREIGN PATENT DOCUMENTS
| JP | 11-283012 | 10/1999 |
| JP | 2002-310689 | 10/2002 |
| JP | 2005-008058 | 1/2005 |
| JP | 2006-338555 | 12/2006 |

OTHER PUBLICATIONS

Ali, et al. (Shadow Based On-Road Vehicle Detection and Verification Using Haar Wavelet Paket Transform), pp. 1-5, Aug. 2005.*

* cited by examiner

*Primary Examiner* — Daniel Mariam
(74) *Attorney, Agent, or Firm* — Young & Thompson

(57) ABSTRACT

A graphic recognition device, method, and recognition program recognize graphics without being influenced by an image shadow area. Image input unit acquires the image of the outside environment of a vehicle using a vehicle mounted camera. A light source location information acquiring unit calculates location of a light source such as the sun using the acquired image. User vehicle shape acquiring unit and other vehicle shape acquiring unit generate shape information for the vehicles indicating the location of points forming vehicle contours. Shadow area calculating unit calculates, on the basis of both vehicles' shape information, the object shape information and the light source location information, the location coordinates of the shadow area, and converts the location coordinates into two-dimensional coordinates to the shadow/non-shadow area emphasis flag recognizing unit, which recognizes the flag in the image by judging the presence/absence of the recognition object in each shadow and non-shadow area specified.

29 Claims, 7 Drawing Sheets

GRAPHIC RECOGNITION DEVICE, GRAPHIC RECOGNITION METHOD, AND GRAPHIC RECOGNITION PROGRAM

TECHNICAL FIELD

The present invention relates to graphic recognition devices for recognizing graphics in an image, flag recognition methods, and flag recognition programs, in particular, to a graphic recognition device for recognizing a flag in an image photographed by an in-vehicle camera, a flag recognition method, and a flag recognition program.

BACKGROUND ART

Most traffic accidents by automobiles are caused by the oversight of the driver due to the presence of blind corner or lack of attention. It is important for the drivers to accurately recognize road signs such as "stop", or road information related to safety such as road surface sign indicating crossing, stop line, speed limit, and the like for safe driving. As a technique of recognizing the surrounding signs and notifying the same to the driver, a method of establishing a communication between the road surface and the vehicle, a method of performing pattern recognition on the image acquired by the vehicle exterior photographic camera, and the like are used.

In an image recorded with outside environment of a vehicle for performing pattern recognition, various objects such as buildings, roadside trees, advertising displays, pedestrians, and other vehicles exist other than the sign to be recognized. Such objects greatly affect the pattern recognition of the sign. For instance, pattern recognition might be inhibited if one part of the crossing is shielded by the preceding vehicle passing through the intersection, or one part of the white line is shielded by the pedestrian walking on the road of an urban area.

The shadow of the object also influences the recognition result of the pattern recognition of the sign. For instance, the road surface sign may not be recognized if photographed as if the contrast of one part of the road surface sign is significantly lowered by the shadow of the own vehicle that is traveling and the shadow of the road sign on the road surface during the day time.

This means that the information is completely missing on the pattern portion shielded by the object, and the information of the shielded portion cannot be obtained unless previous knowledge of the pattern shape etc. is used. On the other hand, if the contrast of the pattern is changed by the shadow, information related to the pattern shape is not completely missing, and thus the original pattern shape information can be restored.

In pattern recognition, it is known that the recognition rate can be enhanced when recognition is performed using the entire recognition object as much as possible compared to the case in which recognition is performed using only one part of the recognition object due to reasons of difference in vision. Therefore, it is important to specify the shadow of the object in the image, and perform flag recognition with being emphasized in the area with shadow (shadow area) or the area without shadow (non-shadow area) in order to perform a flag recognition process with high reliability.

The location of a light source needs to be specified to specify the shadow of the object in the image. A technique of acquiring location information of the sun and using the same in the control of a vehicle or in a car navigation system (hereinafter referred to as car navigation) is disclosed in patent document 1 and patent document 2.

In the system disclosed in patent document 1, a shield for shielding a specific site of a vehicle from the solar light is controlled by calculating the location of the sun from the angle of inclination, the advancing direction, the position, and the date and time of travel of the own vehicle.

The system disclosed in patent document 2 is a system of calculating the location of the sun from the position, the direction, and the date of travel of the own vehicle, and applying a display color, a display shape, and a display shade in accordance with the actual weather condition on the car navigation screen with respect to the display object such as the sun, the building, and the sign.

Patent document 1: Japanese Laid-Open Patent Publication No. 2005-8058 (paragraphs 0033 to 0043)
Patent document 2: Japanese Laid-Open Patent Publication No. 2002-310689 (paragraphs 0039 to 0049)

DISCLOSURE OF THE INVENTION

However, in the system disclosed in patent document 1, the location of the sun is calculated, but the shadow area generated by the object is not specified, and thus information on the shadow area cannot be applied to the flag recognition process.

Furthermore, in the system disclosed in patent document 2, after calculating the location of the sun, the actual shadow area is specified based on a map database and displayed as a shade on the object on the map, but the shadow generated by the moving object such as a vehicle existing in the road image at high probability is not taken into consideration. Moreover, the recognition process is not performed after specifying the shadow area, and a flag recognition robust to the influence of the shadow area is not realized.

It is an object of the present invention to provide a graphic recognition device, a graphic recognition method, and a graphic recognition program for recognizing a flag without being influenced by the shadow area existing in the image.

In to achieve the above aim, a graphic recognition device of the present invention relates to a graphic recognition device for recognizing a graphic in an image photographed by a photographic device, the graphic recognition device including a shadow area calculating unit for calculating an area of a shadow of an object in the image; an area graphic recognizing unit for determining whether or not a predefined specific graphic exists in the image individually for an inside and an outside of the area of the shadow calculated by the shadow area calculating unit; and a graphic recognizing unit for determining whether or not the specific graphic exists in the image based on a result determined by the area graphic recognizing unit.

In the above-described graphic recognition device, the area graphic recognizing unit determines whether or not the specific graphic exists after emphasizing contrast on the area of the shadow in the image. With this, an accurate pattern recognition can be realized even for the area of the shadow in the image.

The shadow area calculating unit may calculate the area of the shadow based on light source location information indicating a location of a light source, and object location information indicating an actual location of a plurality of points forming a contour of an object forming the shadow.

The shadow area calculating unit may calculate a point at the intersection of a line passing through one point indicated by the light source location information and one point indicated by the object location information with the ground as a point in the area of the shadow. According to such configuration, the shadow area can be calculated based on the location information of the light source and the shape information of the object.

The area graphic recognizing unit may determine whether or not the specific graphic exists individually for the inside and the outside of the area of the shadow by template matching.

The area graphic recognizing unit may determine whether or not the specific graphic exists individually for the inside and the outside of the area of the shadow based on a statistical learning using neural network.

The area graphic recognizing unit may judge presence/absence of a periodicity of a specific pattern for the inside and the outside of the area of the shadow if the specific graphic has periodicity.

The area graphic recognizing unit may output the determination result for the inside and the outside of the area of the shadow in numerical values; and the graphic recognizing unit may determine whether or not the specific graphic exists in the image based on a magnitude relationship between the determination result for each area output by the area graphic recognizing unit and a predefined threshold value. According to such configuration, if the matching score in each area is greater than or equal to a threshold value, it can be determined that the flag to be recognized exists.

The graphic recognizing unit may determine whether or not the specific graphic exists in the image based on a magnitude relationship between a weighted linear sum of the determination result for each area output by the area graphic recognizing unit and a predefined threshold value. According to such configuration, if the matching score limited only to either the shadow area or the non-shadow area is greater than or equal to the threshold value, it can be determined that the flag to be recognized exists.

The graphic recognition device may further include a light source location position acquiring unit for calculating the location of the light source from the location, of the photographic device and a photographing direction, and outputting as the light source location information.

The light source location information may be information indicating an actual location of a celestial object.

The light source location information may be information indicating an actual location of an artificial light source.

The shadow area calculating unit may calculate the area of the shadow estimated based on the light source location information, compare the same with a corresponding portion in the image, and specify the area of the shadow based on the comparison result. In this case, the light source location information may be information indicating a location of a virtual light source. The shadow area thus can be calculated even if the location of the light source is not accurately known.

The graphic recognition device may further include an own vehicle shape acquiring unit for calculating information indicating an actual location of each point forming a contour of an own vehicle based on coordinate data indicating a contour shape of the own vehicle mounted with the photographic device and location information of the photographic device, and outputting as the object location information.

The graphic recognition device may further include an other vehicle shape acquiring unit for calculating information indicating an actual location of each point forming a contour of other vehicle based on coordinate data indicating a contour shape of the other vehicle near the own vehicle mounted with the photographic device and the location information of the photographic device, and outputting as the object location information.

The graphic recognition device may also include a map database for storing information indicating the contour shape and the location of a structure as the object location information.

A graphic recognition method of the present invention relates to a graphic recognition method for recognizing a graphic in an image photographed by a photographic device, the method including shadow area calculating step of calculating an area of a shadow of an object in the image; area graphic recognizing step of determining whether or not a predefined specific graphic exists individually for an inside and an outside of the area of the shadow calculated in the shadow area calculating step; and graphic recognizing step of determining whether or not a specific graphic exists in the image based on a result determined in the area graphic recognizing step.

In the area graphic recognizing step, whether or not the specific graphic exists may be determined after emphasizing a contrast on the area of the shadow in the image.

In the shadow area calculating step, the area of the shadow may be calculated based on light source location information indicating a location of a light source, and object location information indicating an actual location of a plurality of points forming a contour of the body forming the shadow.

In the shadow area calculating step, a point at the intersection of a line passing through one point indicated by the light source location information and one point indicated by the object location information with the ground may be calculated as a point in the area of the shadow.

In the area graphic recognizing step, whether or not the specific graphic exists may be determined individually for the inside and the outside of the area of the shadow by template matching.

In the area graphic recognizing step, whether or not the specific graphic exists may be determined individually for the inside and the outside of the area of the shadow based on a statistical learning using neural network.

In the area graphic recognizing step, presence/absence of a periodicity of a specific pattern may be judged for the inside and the outside of the area of the shadow if the specific graphic has periodicity.

In the area graphic recognizing step, the respective determination results for the inside and the outside of the area of the shadow may be output in numerical values; and in the graphic recognizing step, whether or not the specific graphic exists in the image may be determined based on a magnitude relationship between the determination result for each area output in the area graphic recognizing step and a predefined threshold value.

In the graphic recognizing step, whether or not the specific graphic exists in the image may be determined based on a magnitude relationship between a weighted linear sum of the determination result for each area output in the area graphic recognizing step and a predefined threshold value.

The graphic recognition method may further include a light source location position acquiring step of calculating the location of the light source from the location of the photographic device and a photographing direction, and having as the light source location information.

The light source location information may be information indicating an actual location of a celestial object.

The light source location information may be information indicating an actual location of an artificial light source.

In the shadow area calculating step, the area of the shadow estimated based on the light source location information may be calculated and compared with a corresponding portion in the image to specify the area of the shadow. In this case, the light source location information may be information indicating a location of a virtual light source.

The above-described graphic recognition method may further include an own vehicle shape acquiring step of calculating information indicating an actual location of each point forming a contour of an own vehicle based on coordinate data indicating a contour shape of the own vehicle mounted with the photographic device and location information of the photographic device, and having the same as the object location information.

The graphic recognition method may further include an other vehicle shape acquiring step of calculating information indicating an actual location of each point forming a contour of other vehicle based on coordinate data indicating a contour shape of the other vehicle near the own vehicle mounted with the photographic device and the location information of the photographic device, and having the same as the object location information.

The graphic recognition method may have the information indicating the contour shape and the location information of a structure as the object location information.

A graphic recognition program of the present invention relates to a graphic recognition program loaded in a computer for recognizing a graphic in an image photographed by a photographic device, the program causing execution of shadow area calculating process of calculating an area of a shadow of an object in the image; area graphic recognition process of determining whether or not a predefined specific graphic exists individually for an inside and an outside of the area of the shadow calculated in the shadow area calculating process; and graphic recognition process of determining whether or not a specific graphic exists in the image based on a result determined in the area graphic recognition process.

The present invention has configurations and functions as described above, so that after accurately specifying a shadow area in an image actually acquired from a vehicle exterior photographic camera using information such as own vehicle shape, other vehicle shape, and other object shape, flag recognition is executed in the shadow area and the non-shadow area in an emphasized manner, and the flag recognition can be executed without being influenced by the shadow.

BEST MODE FOR CARRYING OUT THE INVENTION

Exemplary embodiments of the invention will be hereinafter described with reference to the drawings.
[First Exemplary Embodiment]
FIG. 1 is a block diagram showing a configuration of a graphic recognition device of a first exemplary embodiment of the present invention. The graphic recognition device includes an image input unit 1, a light source location information acquiring unit 2, an own vehicle shape acquiring unit 3, other vehicle shape acquiring unit 4, a shadow area calculating unit 5, a shadow/non-shadow area emphasis flag recognizing unit 6, a recognition result output unit 7, and a three-dimensional map database 10.

The image input unit 1 inputs the image of the outside environment of a vehicle photographed with a vehicle exterior photographic camera (photographic device) mounted on the own vehicle. The image input unit 1 inputs the image of the outside environment of a vehicle photographed with the in-vehicle camera, converts the same to a digital image, and outputs to the shadow/non-shadow area emphasis flag recognizing unit 6.

The light source location information acquiring unit 2 calculates the location of the light source such as the sun. The light source location information acquiring unit 2 acquires the position and the azimuth at which the own vehicle is traveling from GPS (Global Positioning System), calculates the location of the sun from the date and time of travel, and outputs the same to the shadow area calculating unit 5 as light source location information.

The own vehicle shape acquiring unit 3 acquires the shape information of the own vehicle (own vehicle shape information). The own vehicle shape information is a collection of three-dimensional coordinate data indicating the locations of the individual points forming the contours of the own vehicle. The own vehicle shape acquiring unit 3 stores in advance the three-dimensional coordinate data indicating the contour shape of the own vehicle which is already known. The own vehicle shape acquiring unit 3 generates the own vehicle shape information indicating the location of individual points forming the contour of the own vehicle based on data indicating the contour shape of the own vehicle stored in advance and location information of the own vehicle acquired from the GPS, and outputs the same to the shadow area calculating unit 5. The own vehicle shape does not need to be calculated using the data indicating the contour shape of the own vehicle which is already known, and thus rapid process can be accomplished.

The other vehicle shape acquiring unit 4 acquires shape information (other vehicle shape information) of the other vehicle. The other vehicle shape information is a collection of three-dimensional coordinate data indicating the location of individual points forming a contour of the other vehicle. The other vehicle shape acquiring unit 4 recognizes the other vehicle as a rigid body raised from the road surface by using methods such as rigid object detection with millimeter wave radar mounted on the own vehicle and image processing by stereo matching, and stores the three-dimensional coordinate data indicating the contour shape. Here, the other vehicle unit a vehicle near the own vehicle, and for example, means a vehicle other than the own vehicle in the photographed image when recognizing through image processing.

The other vehicle shape acquiring unit 4 stores the location information of the other vehicle observed from the own vehicle. The other vehicle shape acquiring unit 4 acquires the location information of the other vehicle by acquiring the location relationship with the own vehicle with the principle of triangulation by stereo matching, or measuring the distance with other vehicle using the millimeter wave radar and calculating from the camera parameter. The other vehicle shape acquiring unit 4 generates the other vehicle shape information indicating the locations of individual points forming the contour of the other vehicle based on the data indicating the contour shape of the other vehicle and the location information of the other vehicle, and outputs the same to the shadow area calculating unit 5.

The three-dimensional map database 10 is a database for storing information (object shape information) indicating the shape and the location on structures (objects) such as road, building, and sign. The object shape information is three-dimensional coordinate data of latitude, longitude, height etc. indicating eight vertices in such cases as a building and the like that can be approximated to a rectangular solid.

The shadow area calculating unit 5 specifies the shadow area from the light source location information that is the output of the light source location information acquiring unit 2, the own vehicle shape information that is the output of the own vehicle shape acquiring unit 3, other vehicle shape information that is the output of the other vehicle shape acquiring unit 4, and the object shape information stored in the three-dimensional map database 10. That is, the shadow area calculating unit 5 calculates the actual position coordinate of the shadow area formed by the own vehicle, the other vehicle, and the object without using an image.

FIG. 2 is an explanatory view describing one example of a method for the shadow area calculating unit 5 to specify the shadow area. Specifically, as shown in FIG. 2, the shadow area calculating unit 5 assumes a closed space surrounded by the outer contour of the vehicle and the object as an inner area (inner space) of the vehicle and the object. When a path of the light beam connecting the light source S and one point A on the road surface passes through such inner area, the path is considered as the path of the light beam forming the shadow, and the one point A on the road surface is specified as a point in the shadow area.

The shadow area calculating unit 5 calculates in advance a correspondence relationship of a two-dimensional coordinate on an image acquired by the image input unit 1, and the actual three-dimensional coordinate. Specifically, the shadow area calculating unit 5 obtains through calculation the correspondence relationship of the two-dimensional coordinate on the image and the actual three-dimensional coordinate using the attachment state of the camera (attachment position, attachment angle, etc. in the vehicle) and the camera parameter (focal length, CCD cell size, etc.).

The shadow area calculating unit 5 converts the three-dimensional coordinate data of the calculated shadow area to the two-dimensional coordinate on the image, and outputs the same to the shadow/non-shadow area emphasis flag recognizing unit 6. The shadow area on the image thus can be specified.

The shadow/non-shadow area emphasis flag recognizing unit 6 performs a process of recognizing the flag in the shadow area and the non-shadow area, respectively. FIG. 3 is an explanatory view describing one example of a method for the shadow/non-shadow area emphasis flag recognizing unit 6 to recognize the flag. As shown in FIG. 3, the shadow/non-shadow area emphasis flag recognizing unit 6 divides the image input to the image input unit 1 to the shadow area and the non-shadow area, emphasizes the contrast of the shadow area, and performs recognition process such as matching with a template corresponding to the flag of the recognition object in each area.

In other words, the shadow/non-shadow area emphasis flag recognizing unit 6 judges the presence/absence of the flag of the recognition object in each shadow area and the non-shadow area. The shadow/non-shadow area emphasis flag recognizing unit 6 judges that the flag of the recognition object is present in the image if the sum of the matching scores in the non-shadow area and the matching score in the shadow area is greater than or equal to a threshold value, and outputs the recognition process result to the recognition process result output unit 7. The recognition process result is information indicating the recognized flag such as flag name. The recognition process result output unit 7 is, for example, a display device for displaying the recognition process result.

The shadow/non-shadow area emphasis flag recognizing unit 6 may perform the flag recognition process limiting only to the non-shadow area, and judge that the flag is present if the matching score in the non-shadow area is greater than or equal to the threshold value. The shadow/non-shadow area emphasis flag recognizing unit 6 may also calculate the areas of the non-shadow area and the shadow area, and judge that the flag is present if the matching score in the larger area is greater than or equal to the threshold value.

The recognition process performed by the shadow/non-shadow area emphasis flag recognizing unit 6 in the non-shadow area and the shadow area may be a recognition process based on a statistical learning using neural network.

If the flag of the recognition object is a pattern having periodicity such as a crossing, the recognition process performed by the shadow/non-shadow area emphasis flag recognizing unit 6 in the non-shadow area and the shadow area may be a filtering process that reacts to the periodicity of the pattern such as Fourier transformation and Gabor feature quantity.

In the first exemplary embodiment, the shadow/non-shadow area emphasis flag recognizing unit 6 is configured as above, and thus serves as an area graphic recognition unit for individually judging whether or not a specific graphic is present for the inside and the outside of the area of the shadow calculated by the shadow area calculating unit 5, and as a graphic recognition unit for judging, based on the result, whether or not a specific graphic is present in the image.

In the first exemplary embodiment, a case where the light source location information acquiring unit 2 calculates the location of the sun as the light source is described, but the light source is not limited thereto. The location information of the moon may be acquired at night, and the shadow formed by the moonlight may be calculated.

The graphic recognition device can be realized on a computer, and each components configuring the graphic recognition device, that is, the image input unit 1, the light source location information acquiring unit 2, the own vehicle shape acquiring unit 3, the other vehicle shape acquiring unit 4, the shadow area calculating unit 5, the shadow/non-shadow area emphasis flag recognizing unit 6, and the recognition result output unit 7 can be realized as a program for causing a processing unit (CPU) of the computer to realize the above-described functions. Realization of each component configuring the graphic recognition device with a computer, and realization as a program are not limited to the first exemplary embodiment, and are also applicable in second and third exemplary embodiments.

The operation of the first exemplary embodiment will be described with reference to FIG. 1 and FIG. 4.

FIG. 4 is a flowchart showing the operation of the graphic recognition device of the first exemplary embodiment. FIG. 4 shows a flowchart of the process excluding the image input unit 1 and the recognition result output unit 7, where step S1 shows the operation of the light source location information acquiring unit 2, step S2 and step S3 of the own vehicle shape acquiring unit 3, step S4 and step S5 of the other vehicle shape acquiring unit 4, step S6 of the three-dimensional map database 10, step S7 to step S15 of the shadow area calculating unit 5, and step S16 to step S21 of the shadow/non-shadow area emphasis flag recognizing unit 6.

In step S1, the light source location information acquiring unit 2 calculates the location (Sx, Sy, Sz) of the sun on the three-dimensional space from the own vehicle location information, azimuth information, and the date and time of travel from the GPS.

In step S2, the own vehicle shape acquiring unit 3 acquires the three-dimensional coordinate data indicating the location of each point forming the outer contour of the own vehicle as own vehicle shape information. In step S3, a surrounded closed area space is assumed as the interior of the own vehicle by the own vehicle shape information acquired in step S2, and an array Car representing the space inside the vehicle is generated. Here, the array Car is an array indicating whether or not the coordinate (x, y, z) is inside the vehicle, and the array element is represented as Car[0] [x] [y] [z]. For instance, if the coordinate (x, y, z) is inside the own vehicle, the corresponding array element Car[0] [x] [y] [z] is to be 1, and if on the outside of the own vehicle, Car[0] [x] [y] [z] is to be 0.

In step S4, the other vehicle shape acquiring unit 4 acquires the three-dimensional coordinate data indicating the location of each point forming the outer contour of all other vehicles as the other vehicle shape information with the total number of other vehicles as N. In step S5, the array Car representing the space inside the vehicle is generated for each of the N other vehicles. For instance, if the coordinate (x, y, z) is inside the $i^{th}$ (i=1, 2, ..., N) other vehicle, the corresponding array element Car[i] [x] [y] [z] is to be 1, and if on the outside of the own vehicle, Car[i] [x] [y] [z] is to be 0.

In step S6, the shadow area calculating unit 5 acquires the outer contour information of a three-dimensional object as the object shape information from the three-dimensional map database 10. Here, the total number of acquired object is to be M.

In step S7, the shadow area calculating unit 5 generates an array OBJ representing a space inside the object. For instance, if the coordinate (x, y, z) is inside the $j^{th}$ (j=1, 2, ..., M) object, the corresponding array element OBJ[j] [x] [y] [z] is to be 1, and if on the outside of the object, OBJ[j] [x] [y] [z] is to be 0.

In step S8, the shadow area calculating unit 5 focuses on a point (x, y, 0) on the road surface, and calculates a line segment 1 connecting (x, y, 0) and the location (Sx, Sy, Sz) of the sun obtained in step S1.

In step S9, the shadow area calculating unit 5 focuses on a coordinate (x', y', z') on the line segment 1, and in step S10, generates array value Car[i] [x'] [y'] [z'] (i=0, 1, ..., N) and OBJ[j] [x'] [y'] [z'] (j=1, 2, ..., M) corresponding to the coordinate (x', y', z'), and determines whether or not any array value is to be 1. This determination uses the fact that when a point being in a shadow on the road surface and the coordinate of the sun are connected, the path of the light beam is always shielded by some kind of object.

If the result is yes in step S10, that is, if there is Car[i] [x'] [y'] [z'] (i=0, 1, ..., N)=1 or OBJ[j] [x'] [y'] [z'] (j=1, 2, ..., M)=1, the coordinate (x, y, 0) on the road surface is assumed as the coordinate within the shadow area. In step S11, the shadow area calculating unit 5 assumes the value of the corresponding element value Shadow[x] [y] of the shadow area array Shadow (element values are all initialized at 0) as 1, and proceeds to step S14.

If the result is no in step S10, that is, if there is no Car[i] [x'] [y'] [z'] (i=0, 1, ..., N)=1 or OBJ[j] [x°] [y'] [z'] (j=1, 2, ..., M)=1, the process proceeds to step S12, and whether or not the determination of S10 is performed for all the coordinates on the line segment 1 is determined.

If the result is no in step S12, that is, if there are coordinates not performed with the determination of step S10, the process proceeds to step S13, and a coordinate on the line segment 1 not yet subjected to determination is selected, and the process proceeds to step S9. If the result is yes in step S12 (determination of step S10 is performed on all the coordinates on the line segment 1), the process proceeds to step S14.

Whether or not the processes of step S8 to step S13 are executed on all the coordinates on the road surface is determined in step S14. If the result is no in step S14, that is, if the processes are not executed on some of the coordinates on the road surface, the process proceeds to step S15, the coordinate on the road surface not yet subjected to determination is selected, and the process proceeds to step S8. If the result is yes in step S14, that is, if the processes are executed on all the coordinates on the road surface, the process proceeds to step S16.

In step S16, the shadow area calculating unit 5 converts the coordinate (x, y, 0) satisfying Shadow[x] [y]=0 representing the non-shadow area to a two-dimensional coordinate on the image to specify the non-shadow area on the image, and outputs the same to the shadow/non-shadow area emphasis flag recognizing unit 6. The shadow/non-shadow area emphasis flag recognizing unit 6 then executes template matching in the non-shadow area on the image, and calculates the score value SC1 thereof.

In step S17, the shadow area calculating unit 5 executes contrast enhancement of the image at the coordinate (x, y, 0) satisfying Shadow[x] [y]=1 representing the shadow area. In step S18, the shadow area calculating unit 5 converts the coordinate (x, y, 0) satisfying Shadow[x] [y]=1 to a two-dimensional coordinate on the image to specify the shadow area on the image, and outputs the same to the shadow/non-shadow area emphasis flag recognizing unit 6. The shadow/non-shadow area emphasis flag recognizing unit 6 then executes template matching in the shadow area on the image, and calculates the score value SC2 thereof.

In step S19, the shadow/non-shadow area emphasis flag recognizing unit 6 calculates a weighted linear sum w1×SC1+w2×SC2 of SC1 and SC2 using the weighting coefficients w1 and w2 set in advance. A case of w1=0 and w2≠0 corresponds to template matching limited only to the shadow area, and a case of w1≠0 and w2=0 corresponds to template matching limited only to the non-shadow area.

The shadow/non-shadow area emphasis flag recognizing unit 6 then determines the magnitude relationship of the weighted linear sum w1×SC1+w2×SC2 of SC1 and SC2, and the predefined threshold value Thre. If w1×SC1+w2×SC2 is greater than Thre, a flag pattern corresponding to the template is determined as present in step S20, and if smaller, the flag pattern corresponding to the template is determined as not present in step S21, and the series of processes are terminated.

As described above, according to the first exemplary embodiment, the flag recognition robust to the influence of the shadow can be executed by calculating the shadow area based on the location information of the object and the sun, and, performing the recognition process in both the shadow area and the non-shadow area.

[Second Exemplary Embodiment]

A second exemplary embodiment of the invention will now be described with reference to the drawings.

FIG. 5 is a block diagram showing a configuration of a graphic recognition device of the second exemplary embodiment of the invention. The graphic recognition device of the second exemplary embodiment calculates the location information of the light source from the location of the own vehicle, the location of the other vehicle, and the three-dimensional map database.

The light source location information acquiring unit 2 calculates the location of the light source with the own vehicle shape information obtained from the own vehicle shape acquiring unit 3, the other vehicle shape information and the location information of the other vehicle obtained from the other vehicle shape acquiring unit 4, and the object shape information stored in the three-dimensional map database 10 as inputs. As shown in FIG. 5, the second exemplary embodiment differs from the first exemplary embodiment in that the outputs of the own vehicle shape acquiring unit 3 and the other vehicle shape acquiring unit 4, and the output of the three-dimensional map database 10, are inputs of the light source location information acquiring unit 2.

The operation of the second exemplary embodiment will be described with reference to FIG. 5.

The light source location information acquiring unit 2 acquires the three-dimensional coordinate data of the locations of a headlight and a tail lamp of the own vehicle from the own vehicle shape information, which is the output of the own vehicle shape acquiring unit 3. The three-dimensional coordinate data of the locations of the headlight and the tail lamp of the other vehicle are calculated from the other shape information and the location information of the other vehicle monitored from the own vehicle, which are the output of the other vehicle shape acquiring unit 4. The own vehicle shape information and the other vehicle shape information contain the three-dimensional coordinate data indicating the locations of the headlight and the tail lamp of the vehicle.

The light source location information acquiring unit 2 acquires the three-dimensional coordinate data indicating the location of the light source portion for the object, that may become the light source such as street lamp, from the object shape information stored in the three-dimensional map database 10. The object shape information includes the three-dimensional coordinate data indicating the location of the light source portion for the object.

That is, the light source location information acquiring unit 2 acquires the three-dimensional coordinate data indicating the locations of the headlight and the tail lamp of the own vehicle and the other vehicle, and the three-dimensional coordinate data indicating the location of the light source portion such as the street lamp, and outputs the same to the shadow area calculating unit 5.

The shadow area calculating unit 5 calculates the shadow area generated by each light source in the image based on the location information of each light source, which is the output of the light source location information acquiring unit 2. Other configurations of the graphic recognition device of the second exemplary embodiment are similar to the configurations of the first exemplary embodiment shown in FIG. 1, and thus the description will be omitted.

As an effect according to the second exemplary embodiment, the light source location information of an artificial light source can be calculated from the own vehicle location, the other vehicle location, and the three-dimensional map data, in addition to the effect of the first exemplary embodiment described above.

[Third Exemplary Embodiment]

Next, a third exemplary embodiment of the invention will be described with reference to the drawings.

FIG. 6 is a block diagram showing a configuration of a graphic recognition device of the third exemplary embodiment of the invention. In the third exemplary embodiment, if the light source location is not accurately known, a plurality of locations is set for the light source location according to a rule defined in advance, and the shadow area calculated from each set location and the actually photographed image are compared to select the shadow area that matches the most.

FIG. 7 is an explanatory view showing one example of a method in which a light source location information acquiring unit 8 shown in FIG. 6 sets a plurality of virtual light sources (virtual sun) as candidates.

The light source location information acquiring unit 8 sets a plurality of virtual suns, and outputs the three-dimensional coordinate data indicating the respective location to the shadow area calculating unit 5.

As shown in FIG. 6, the shadow area calculating unit 5 calculates the shadow area generated when the light source exists at each location set by the light source location information acquiring unit 8 using the own vehicle shape information that is the output of the own vehicle shape acquiring unit 3, the other vehicle shape information that is the output of the other vehicle shape acquiring unit 4, and the object shape information stored in the three-dimensional map database 10. The shadow area calculated by the shadow area calculating unit 5 is obtained by converting the three-dimensional location coordinate to the two-dimensional coordinate on the image.

Also, the shadow area calculating unit 5 compares each calculated shadow area and the image that is the output of the image input unit 1, and selects the shadow area that matches the most. As shown in FIG. 6, the third exemplary embodiment differs from the first exemplary embodiment described above in that the light source location information acquiring unit 8 is arranged, and in that the output of the image input, unit 1 is the input of the shadow area calculating unit 5.

The operation of the third exemplary embodiment will be described below with reference to FIG. 6.

An example where out of the location of the own vehicle, the azimuth from the sun to the own vehicle, and the date and time of travel, which are necessary in calculating the location of the sun, only the azimuth to the own vehicle is unknown will be described.

Since the location of the own vehicle is known, the elevation angle θ of the sun is self-evident, and thus the light source location information acquiring unit 8 sets a plurality of virtual suns at the locations of the elevation angel θ in the sky as shown in FIG. 7. That is, the light source location information acquiring unit 8 outputs the three-dimensional coordinate data indicating the respective locations of the virtual suns at the locations of the elevation angle θ to the shadow area calculating unit 5.

The shadow area calculating unit 5 calculates the shadow areas to be generated by the plurality of virtual suns set by the light source location information acquiring unit 8, respectively, using the own vehicle shape information that is the output of the own vehicle shape acquiring unit 3, the other vehicle shape information that is the output of the other vehicle shape acquiring unit 4, and the object shape information stored in the three-dimensional map database 10. The shadow area calculated by the shadow area calculating unit 5 is obtained by converting the three-dimensional location coordinate to the two-dimensional coordinate on the image.

The shadow area calculating unit 5 then compares each calculated shadow area and the corresponding portion in the image that is the output of the image input unit 1, and specifies a calculated shadow area which is most-well matched with the actual shadow area. For instance, the location of the virtual sun with which the sum of the image pixel values at the relevant portion becomes the smallest is assumed as the actual location of the sun, and the corresponding shadow area is assumed as the actual shadow area.

In the light source location information acquiring unit 8 of the third exemplary embodiment, a case in which the elevation angle θ of the sun is already known has been described, but the location of the virtual sun may be similarly set in a case that the azimuth of the sun is already known.

As an effect according to the third exemplary embodiment, the shadow area can be calculated even if the location of the light source is not accurately known is obtained, in addition to the effect of the first exemplary embodiment described above.

INDUSTRIAL APPLICABILITY

The present invention is applicable to the graphic recognition device for recognizing the flag in the photographed image, in particular, the present invention is suitably implemented in the graphic recognition device using a vehicle exterior photographic camera to perform flag recognition robust to the influence of the shadow existing in the photographed image.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2006-009132, filed on Jan. 17, 2006, the disclosure of which is incorporated herein in its entirety by reference.

Figure 1:
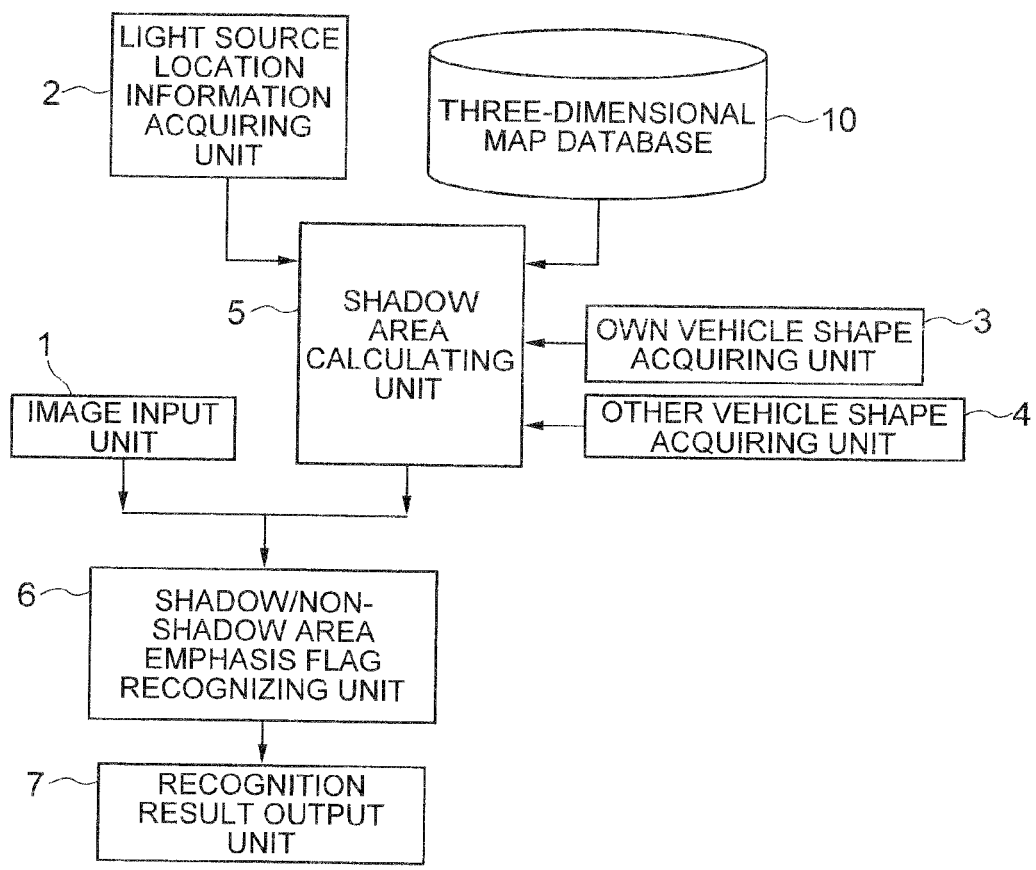
FIG. 1 is a block diagram showing a configuration of a graphic recognition device of a first exemplary embodiment of the invention.
Figure 2:
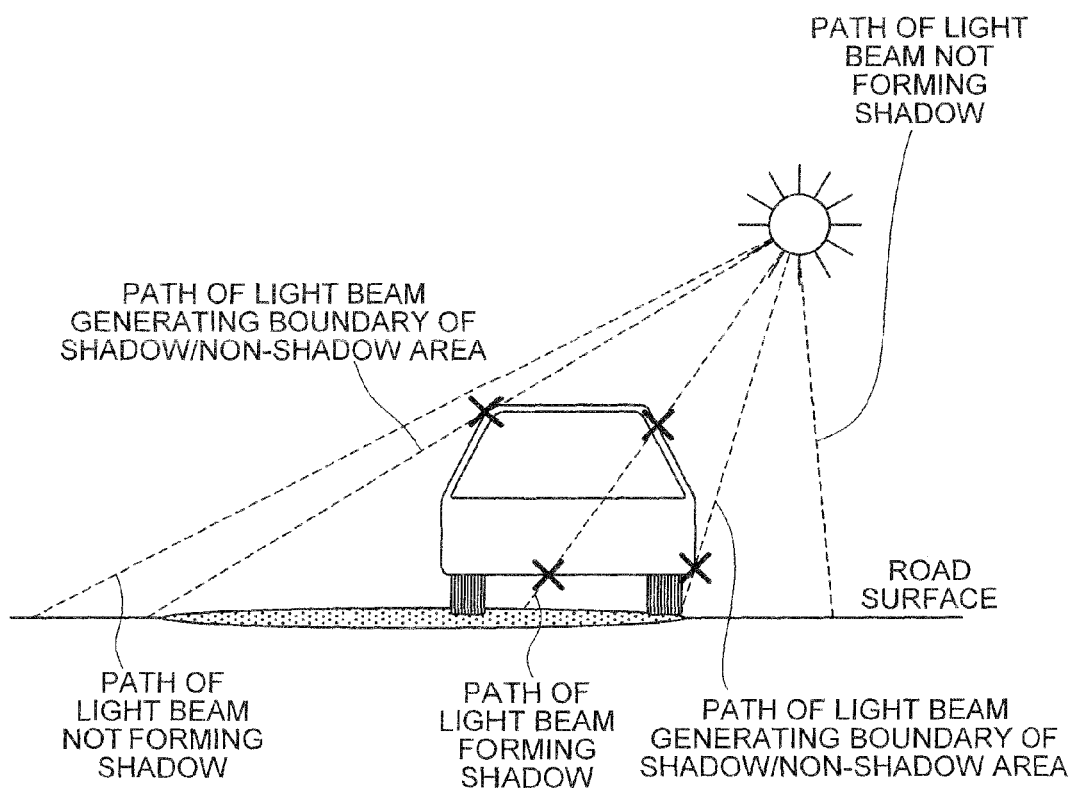
FIG. 2 is an explanatory view showing one example of a method of specifying a shadow area in the exemplary embodiment disclosed in FIG. 1.
Figure 3:
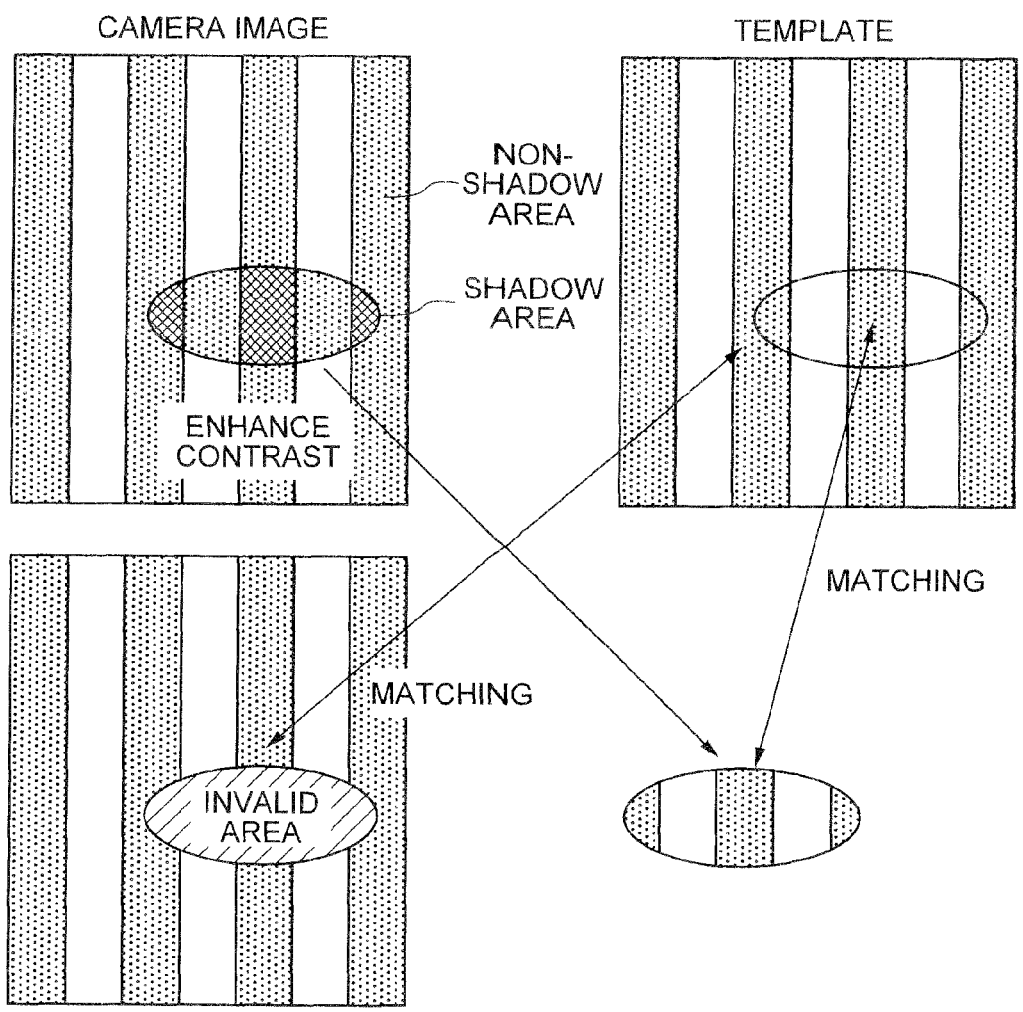
FIG. 3 is an explanatory view showing one example of a method of recognizing a flag in the exemplary embodiment disclosed in FIG. 1.
Figure 4:
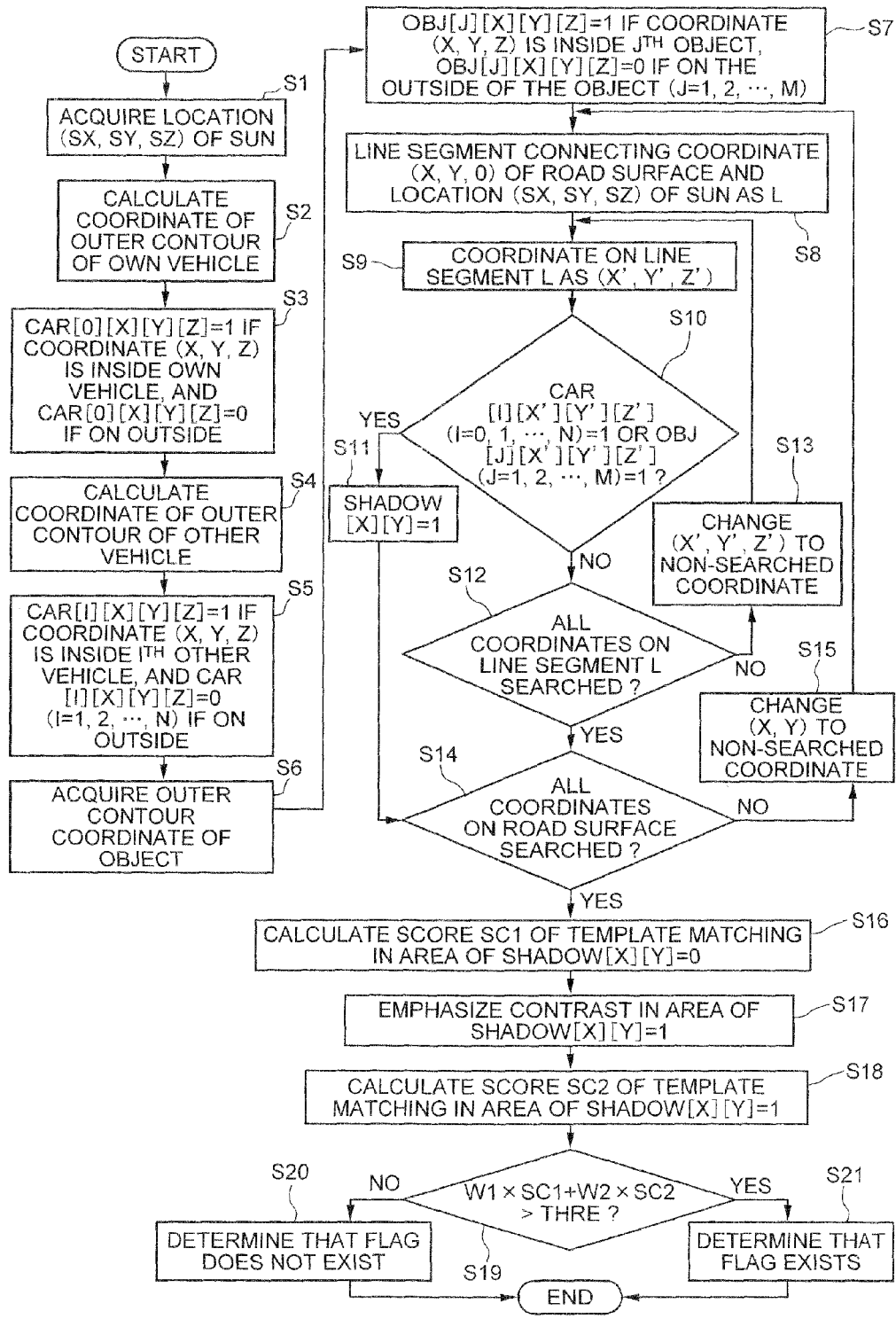
FIG. 4 is a flowchart showing the operation of the graphic recognition device of the exemplary embodiment disclosed in FIG. 1.
Figure 5:
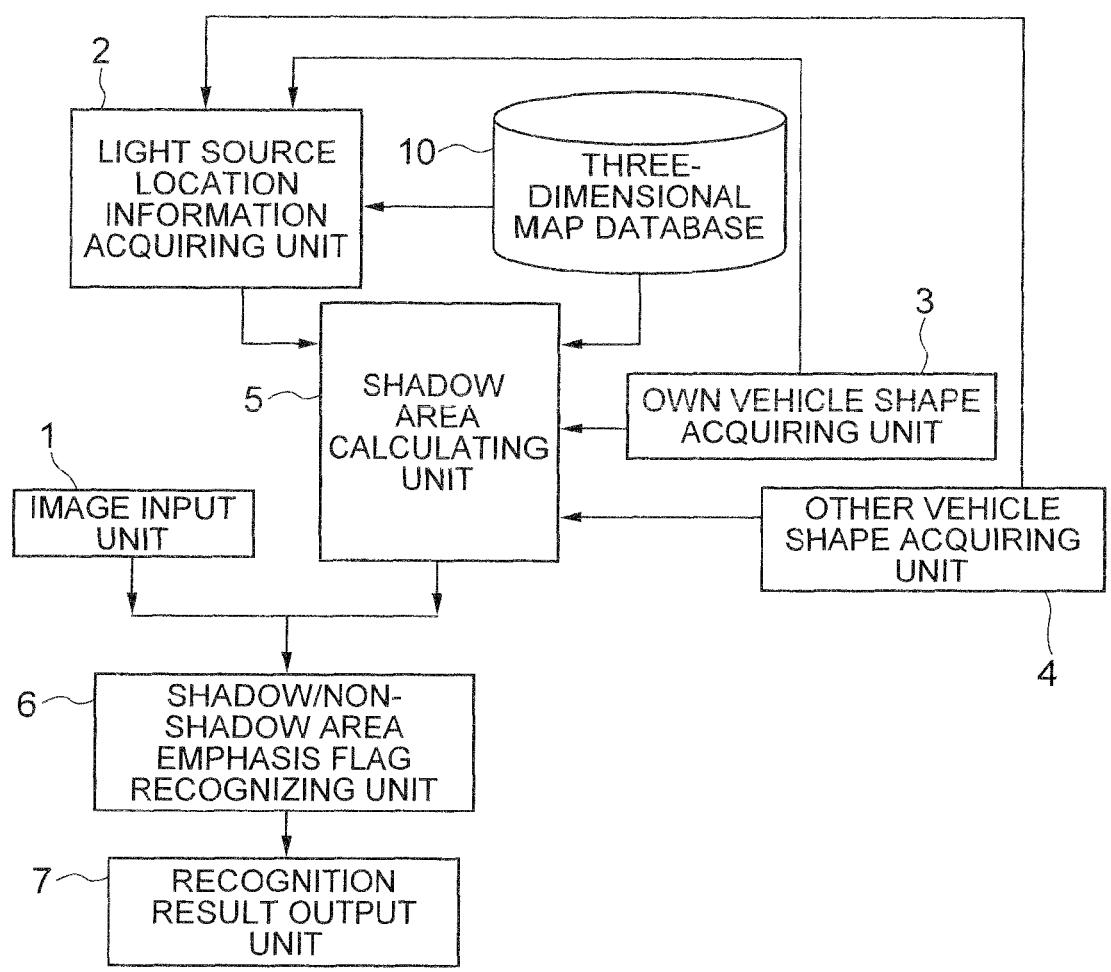
FIG. 5 is a block diagram showing a configuration of a graphic recognition device of a second exemplary embodiment of the invention.
Figure 6:
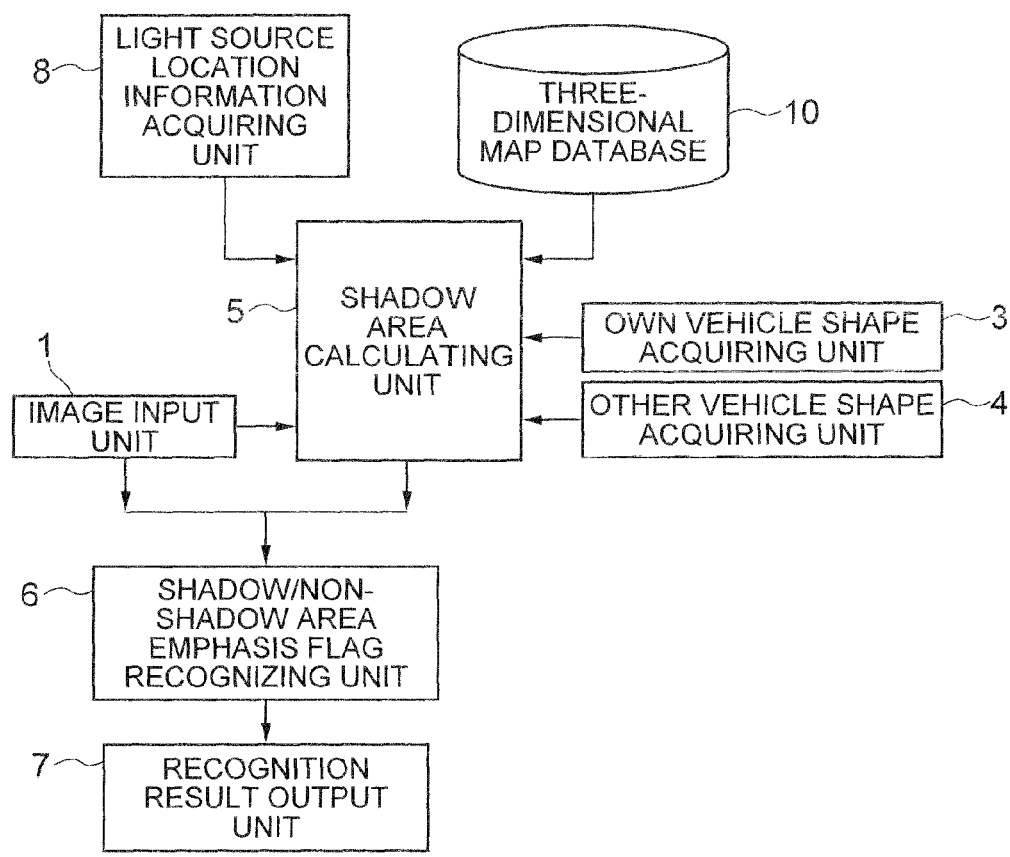
FIG. 6 is a block diagram showing a configuration of a graphic recognition device of a third exemplary embodiment of the invention.
Figure 7:
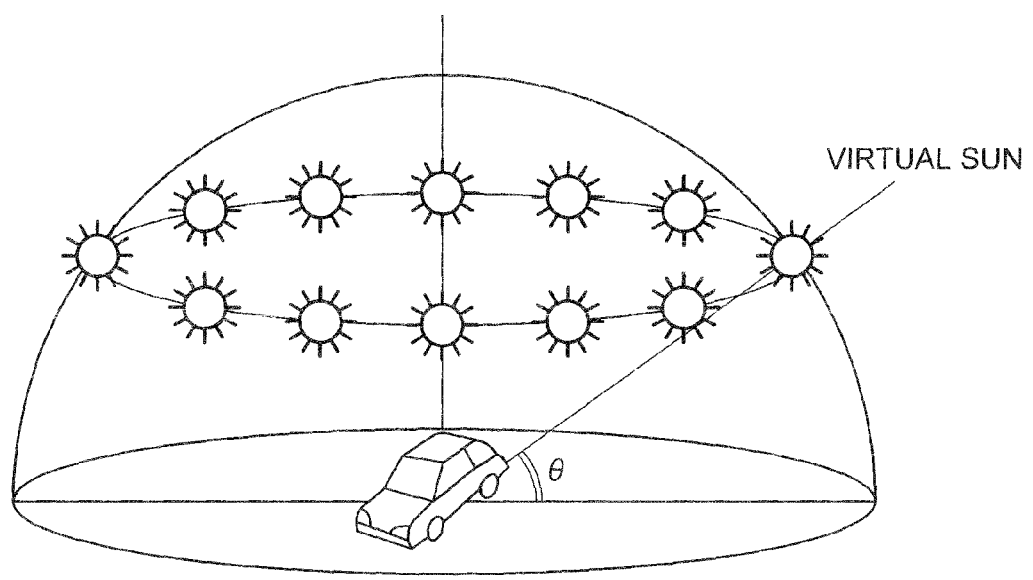
FIG. 7 is an explanatory view showing one example of a method of setting a plurality of light sources in the exemplary embodiment disclosed in FIG. 6.

Description Of Reference Numerals 1 image input unit
2 light source location information acquiring unit
3 own vehicle shape acquiring unit
4 other vehicle shape acquiring unit
5 shadow area calculating unit
6 shadow/non-shadow area emphasis flag recognizing unit
7 recognition result output unit
10 three-dimensional map database

The invention claimed is:

1. A graphic recognition device for recognizing a graphic in an image photographed by a photographic device, the graphic recognition device comprising:
    a shadow area calculating unit for calculating an area of a shadow of an object in the image;
    an area graphic recognizing unit for determining whether or not a predefined specific graphic exists in the image individually for an inside and an outside of the area of the shadow calculated by the shadow area calculating unit; and
    a graphic recognizing unit for determining whether or not the specific graphic exists in the image based on a result determined by the area graphic recognizing unit,
    wherein the shadow area calculating unit calculates the area of the shadow based on light source location information indicating a location of a light source, and object location information indicating an actual location of a plurality of points forming a contour of an object forming the shadow.

2. The graphic recognition device according to claim 1, wherein the shadow area calculating unit calculates a point at the intersection of a line passing through one point indicated by the light source location information and one point indicated by the object location information with the ground as a point in the area of the shadow.

3. The graphic recognition device according to claim 1, further comprising a light source location position acquiring unit for calculating the location of the light source from the location of the photographic device and a photographing direction, and outputting as the light source location information.

4. The graphic recognition device according to claim 1, wherein the light source location information indicates an actual location of a celestial object.

5. The graphic recognition device according to claim 1, wherein the light source location information indicates an actual location of an artificial light source.

6. The graphic recognition device according to claim 1, wherein the shadow area calculating unit calculates the area of the shadow estimated based on the light source location information, compares the same with a corresponding portion in the image, and specifies the area of the shadow based on the comparison result.

7. The graphic recognition device according to claim 6, wherein the light source location information indicates a location of a virtual light source.

8. The graphic recognition device according to claim 1, further comprising an own vehicle shape acquiring unit for calculating information indicating an actual location of each point forming a contour of an own vehicle based on coordinate data indicating a contour shape of the own vehicle mounted with the photographic device and location information of the photographic device, and outputting as the object location information.

9. The graphic recognition device according to claim 1, further comprising an other vehicle shape acquiring unit for calculating information indicating an actual location of each point forming a contour of other vehicle based on coordinate data indicating a contour shape of the other vehicle near the own vehicle mounted with the photographic device and the location information of the photographic device, and outputting as the object location information.

10. The graphic recognition device according to claim 1, further comprising a map database for storing information indicating the contour shape and the location of a structure as the object location information.

11. A graphic recognition device for recognizing a graphic in an image photographed by a photographic device, the graphic recognition device comprising:
    a shadow area calculating unit for calculating an area of a shadow of an object in the image;
    an area graphic recognizing unit for determining whether or not a predefined specific graphic exists in the image individually for an inside and an outside of the area of the shadow calculated by the shadow area calculating unit; and
    a graphic recognizing unit for determining whether or not the specific graphic exists in the image based on a result determined by the area graphic recognizing unit,
    wherein the area graphic recognizing unit determines whether or not the specific graphic exists individually for the inside and the outside of the area of the shadow based on a statistical learning using neural network.

12. A graphic recognition device for recognizing a graphic in an image photographed by a photographic device, the graphic recognition device comprising:

a shadow area calculating unit for calculating an area of a shadow of an object in the image;

an area graphic recognizing unit for determining whether or not a predefined specific graphic exists in the image individually for an inside and an outside of the area of the shadow calculated by the shadow area calculating unit; and a graphic recognizing unit for determining whether or not the specific graphic exists in the image based on a result determined by the area graphic recognizing unit, wherein the area graphic recognizing unit judges presence/absence of a periodicity of a specific pattern for the inside and the outside of the area of the shadow if the specific graphic has periodicity.

13. A graphic recognition device for recognizing a graphic in an image photographed by a photographic device, the graphic recognition device comprising:

a shadow area calculating unit for calculating an area of a shadow of an object in the image;

an area graphic recognizing unit for determining whether or not a predefined specific graphic exists in the image individually for an inside and an outside of the area of the shadow calculated by the shadow area calculating unit; and a graphic recognizing unit for determining whether or not the specific graphic exists in the image based on a result determined by the area graphic recognizing unit, wherein the area graphic recognizing unit outputs the determination result for the inside and the outside of the area of the shadow in numerical values; and the graphic recognizing unit determines whether or not the specific graphic exists in the image based on a magnitude relationship between the determination result for each area output by the area graphic recognizing unit and a predefined threshold value.

14. The graphic recognition device according to claim 13, wherein the graphic recognizing unit determines whether or not the specific graphic exists in the image based on a magnitude relationship between a weighted linear sum of the determination result for each area output by the area graphic recognizing unit and a predefined threshold value.

15. A graphic recognition method for recognizing a graphic in an image photographed by a photographic device, the method comprising:

calculating an area of a shadow of an object in the image;

determining whether or not a predefined specific graphic exists in the image individually for an inside and an outside of the area of the shadow calculated in calculating the area of the shadow of the object in the image; and determining whether or not a specific graphic exists in the image based on a result determined in determining whether or not the predefined specific graphic exists in the image individually for the inside and the outside of the area of the shadow, wherein in calculating the area of the shadow of the object in the image, the area of the shadow is calculated based on light source location information indicating a location of a light source, and object location information indicating an actual location of a plurality of points forming a contour of the body forming the shadow.

16. The graphic recognition method according to claim 15, wherein in calculating the area of the shadow of the object in the image, a point at the intersection of a line passing through one point indicated by the light source location information and one point indicated by the object location information with the ground is calculated as a point in the area of the shadow.

17. The graphic recognition method according to claim 15, wherein in determining whether or not the predefined specific graphic exists in the image, whether or not the specific graphic exists is determined individually for the inside and the outside of the area of the shadow by template matching.

18. The graphic recognition method according to claim 15, further comprising calculating the location of the light source from the location of the photographic device and a photographing direction, and having as the light source location information.

19. The graphic recognition method according to claim 15, wherein the light source location information indicates an actual location of a celestial object.

20. The graphic recognition method according to claim 15, wherein the light source location information indicates an actual location of an artificial light source.

21. The graphic recognition method according to claim 15, wherein in calculating an area of a shadow of an object in the image, the area of the shadow estimated based on the light source location information is calculated and compared with a corresponding portion in the image to specify the area of the shadow.

22. The graphic recognition method according to claim 21, wherein the light source location information indicates a location of a virtual light source.

23. The graphic recognition method according to claim 15, further comprising calculating information indicating an actual location of each point forming a contour of an own vehicle based on coordinate data indicating a contour shape of the own vehicle mounted with the photographic device and location information of the photographic device, and having the same as the object location information.

24. The graphic recognition method according to claim 15, further comprising calculating information indicating an actual location of each point forming a contour of other vehicle based on coordinate data indicating a contour shape of the other vehicle near the own vehicle mounted with the photographic device and the location information of the photographic device, and having the same as the object location information.

25. The graphic recognition method according to claim 15, wherein information indicating the contour shape and the location information of a structure are the object location information.

26. A graphic recognition method for recognizing a graphic in an image photographed by a photographic device, the method comprising:

calculating an area of a shadow of an object in the image;

determining whether or not a predefined specific graphic exists in the image individually for an inside and an outside of the area of the shadow calculated in calculating the area of the shadow of the object in the image; and determining whether or not a specific graphic exists in the image based on a result determined in determining whether or not the predefined specific graphic exists in the image individually for the inside and the outside of the area of the shadow, wherein in determining whether or not the predefined specific graphic exists in the image, whether or not the specific graphic exists is determined individually for the inside and the outside of the area of the shadow based on a statistical learning using neural network.

27. A graphic recognition method for recognizing a graphic in an image photographed by a photographic device, the method comprising:

calculating an area of a shadow of an object in the image;

determining whether or not a predefined specific graphic exists in the image individually for an inside and an outside of the area of the shadow calculated in calculating the area of the shadow of the object in the image; and determining whether or not a specific graphic exists in the image based on a result determined in determining whether or not the predefined specific graphic exists in the image individually for the inside and the outside of the area of the shadow, wherein in determining whether or not the predefined specific graphic exists in the image, presence/absence of a periodicity of a specific pattern is judged for the inside and the outside of the area of the shadow if the specific graphic has periodicity.

28. A graphic recognition method for recognizing a graphic in an image photographed by a photographic device, the method comprising:

calculating an area of a shadow of an object in the image;

determining whether or not a predefined specific graphic exists in the image individually for an inside and an outside of the area of the shadow calculated in calculating the area of the shadow of the object in the image; and determining whether or not a specific graphic exists in the image based on a result determined in determining whether or not the predefined specific graphic exists in the image individually for the inside and the outside of the area of the shadow, wherein in determining whether or not the predefined specific graphic exists in the image, the determination result for the inside and the outside of the area of the shadow is output in numerical values; and in determining whether or not a specific graphic exists in the image, whether or not the specific graphic exists in the image is determined based on a magnitude relationship between the determination result for each area output in determining whether or not the predefined specific graphic exists in the image and a predefined threshold value.

29. The graphic recognition method according to claim 28, wherein in determining whether or not a specific graphic exists in the image, whether or not the specific graphic exists in the image is determined based on a magnitude relationship between a weighted linear sum of the determination result for each area output in determining whether or not the predefined specific graphic exists in the image and a predefined threshold value.

* * * * *